United States Patent
Bardsley et al.

(10) Patent No.: US 7,534,107 B2
(45) Date of Patent: May 19, 2009

(54) INOCULATION TRAINING KIT

(75) Inventors: Ryan S. Bardsley, Cambridge, MA (US); Steven L. Dawson, Carlisle, MA (US); Robert Waddington, Silver Spring, MD (US)

(73) Assignee: The General Hospital Corporation, Boston, MA (US)

( * ) Notice: Subject to any disclaimer, the term of this patent is extended or adjusted under 35 U.S.C. 154(b) by 476 days.

(21) Appl. No.: 10/552,883

(22) PCT Filed: Apr. 13, 2004

(86) PCT No.: PCT/US2004/011346

§ 371 (c)(1),
(2), (4) Date: Oct. 13, 2005

(87) PCT Pub. No.: WO2004/093029

PCT Pub. Date: Oct. 28, 2004

(65) Prior Publication Data

US 2006/0204939 A1    Sep. 14, 2006

Related U.S. Application Data

(60) Provisional application No. 60/462,674, filed on Apr. 14, 2003, provisional application No. 60/467,502, filed on May 2, 2003.

(51) Int. Cl.
  *G09B 23/28* (2006.01)
(52) U.S. Cl. ........................... 434/272; 434/268
(58) Field of Classification Search ............ 434/262, 434/267, 268, 272; 206/223, 570, 571, 572, 206/446, 829
See application file for complete search history.

(56) References Cited

U.S. PATENT DOCUMENTS

| | | | | |
|---|---|---|---|---|
| 2,689,415 A * | 9/1954 | Haver | | 434/272 |
| 4,182,054 A * | 1/1980 | Wise et al. | | 434/268 |
| 4,773,865 A * | 9/1988 | Baldwin | | 434/268 |
| 5,215,469 A * | 6/1993 | Kohnke et al. | | 434/268 |
| 5,425,644 A * | 6/1995 | Szinicz | | 434/268 |
| 5,890,908 A * | 4/1999 | Lampotang et al. | | 434/268 |
| 5,945,056 A * | 8/1999 | Day et al. | | 264/250 |
| 6,336,812 B1 * | 1/2002 | Cooper et al. | | 434/267 |
| 6,488,507 B1 * | 12/2002 | Stoloff et al. | | 434/272 |
| 6,773,263 B2 * | 8/2004 | Nicholls et al. | | 434/267 |
| 6,863,536 B1 * | 3/2005 | Fisher et al. | | 434/272 |
| 7,255,565 B2 * | 8/2007 | Keegan | | 434/272 |
| 2001/0019818 A1 | 9/2001 | Yong | | |
| 2003/0186203 A1 * | 10/2003 | Aboud | | 434/262 |

FOREIGN PATENT DOCUMENTS

| | | | |
|---|---|---|---|
| EP | 0 499 125 A2 | 8/1992 | |
| EP | 0 951 003 A1 | 10/1999 | |
| GB | 2 328 775 A | 3/1999 | |

OTHER PUBLICATIONS

PCT Search Report of the ISA for PCT/US2004/011346 received Jun. 4, 2005.
Written Opinion of the ISA for PCT/US2004/011346 received Jun. 4, 2005.

* cited by examiner

*Primary Examiner*—Kurt Fernstrom
(74) *Attorney, Agent, or Firm*—Quarles & Brady, LLP

(57) ABSTRACT

An inoculation training kit contains a simulated body part and at least one inoculation needle, allowing a user to practice inoculations upon the simulated body part.

47 Claims, 9 Drawing Sheets

INOCULATION TRAINING KIT

CROSS-REFERENCE TO RELATED APPLICATIONS

This application is a National Stage application under 35 U.S.C. §371 of and claims the benefit of International Application No. PCT/US2004/011346 filed on Apr. 13, 2004, which claims priority to Provisional Patent Applications 60/467,502, filed on May 2, 2003 and 60/462,674, filed on Apr. 14, 2003, which are hereby incorporated by reference.

FIELD OF THE INVENTION

This invention relates generally to medical inoculations and, more particularly, to an inoculation training kit.

BACKGROUND OF THE INVENTION

A variety of health risks have been associated with terrorist attacks in the United States and elsewhere. Past terrorist attacks have included the use of weapons and explosives as well as the use of poisons, for example, Ricin and infectious agents, for example, Anthrax. There is a growing concern that terrorists may make use in the future of other infectious agents, and in particular, smallpox.

Smallpox was essentially eradicated by 1977 through a comprehensive global immunization program. Therefore, smallpox vaccinations were globally terminated in 1977. As a result, people born after 1977 are unlikely to have been vaccinated against smallpox, and those vaccinated in 1977 or prior are unlikely to still be protected against the smallpox virus. Though smallpox was eradicated from the worldwide human population, smallpox virus samples still exist in various laboratories worldwide.

Following the attack on the World Trade Center and the Anthrax attack on the federal building in Washington D.C. in 2001, President Bush initiated a national smallpox vaccination program, requesting near-term immunization of military personnel deployed to certain regions. Furthermore, if a smallpox attack occurs, the Center for Disease Control (CDC) suggests rapid vaccination of a variety of other people, including those directly exposed, contacts of those directly exposed, health care workers responsible for the care of those with confirmed infection, laboratory workers who handle smallpox specimens, allied personnel handling laundry, waste, and dead bodies associated with smallpox victims, law enforcement personnel, and EMTs.

A smallpox vaccination is administered using a bifurcated needle to administer the vaccination intradermally, unlike the more typical type of vaccination administered using a hypodermic needle in an intramuscular injection. With the intradermal technique, it is important to administer the vaccination at the correct depth into the skin of a patient, and also to be familiar with characteristics of scarification that occur days after the vaccination to determine if the vaccination was properly administered and to determine if the patient had the proper reaction. Because health care workers have not used intradermal techniques since 1977 to administer smallpox vaccinations, it is possible that, if the need arises to rapidly perform smallpox vaccinations, the health care workers will not be able to properly administer the smallpox vaccinations and will not be able to properly interpret the resulting scarification.

Unlike conventional vaccines, which are made from inactive virus particles, the smallpox vaccine uses live vacinia virus (similar to cowpox) to induce immunity to variola virus (smallpox). Therefore, when administering a smallpox vaccination, it is desirable to reduce or eliminate contamination of other people with the vacinia virus. Methods practiced decades ago to administer smallpox vaccinations were suitable for the elimination of contamination to the other people. It is possible that health care workers have not been trained in the techniques necessary to eliminate the contamination to other people by the vacinia virus.

SUMMARY OF THE INVENTION

The present invention provides an inoculation training kit suitable to train health care workers in proper techniques used in an intradermal smallpox inoculation. While the training kit is discussed for training proper techniques used in the smallpox inoculation, it should be understood that, in other embodiments, an inoculation kit can provide training in proper techniques used in other types of inoculations, including but not limited to, intramuscular injections.

In accordance with the present invention, an inoculation training kit includes a holding container for holding an inoculation needle and a simulated body part. The simulated body part provides a substantially realistic sensory feedback associated with practice inoculations applied with the inoculation needle to the simulated body part.

In accordance with another aspect of the present invention, a simulated body part includes a simulated skin covering and a blood container disposed within the simulated skin covering containing simulated blood. The simulated body part provides a substantially realistic sensory feedback associated with practice inoculations applied to the simulated body part.

In accordance with another aspect of the present invention a holding apparatus includes at least one compartment adapted to hold a vial of vaccine in an upright position, while exposing an end of the vial to be accessible to an inoculation needle. The holding apparatus also includes at least one compartment adapted to hold a vial of vaccine at an angle between about thirty and sixty degrees while exposing the end of the vial to be accessible to the inoculation needle.

With these particular arrangements, training for and application of medical inoculations is improved.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
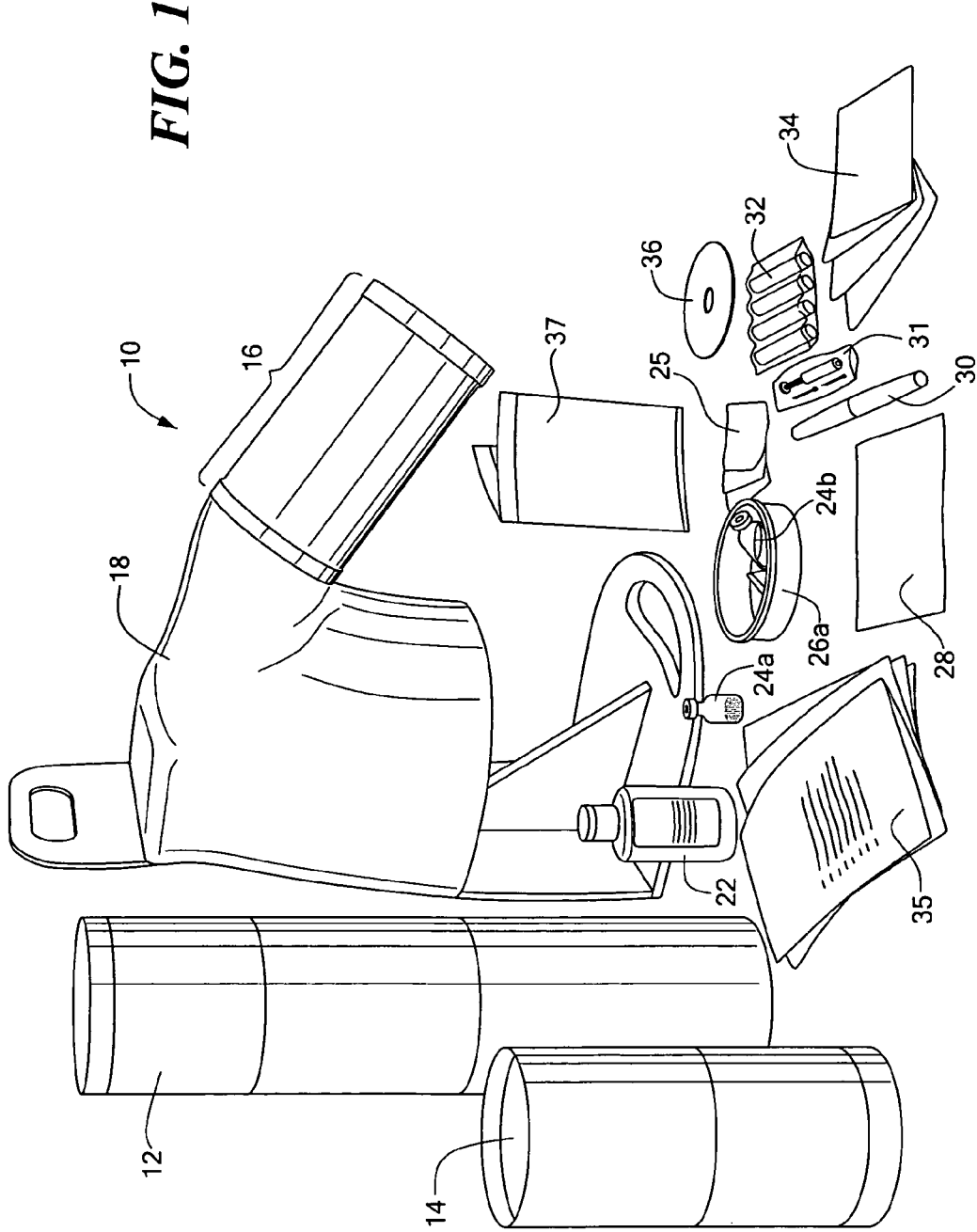
FIG. 1 is a pictorial showing a disassembled inoculation training kit of the present invention.

Referring to FIG. 1, an exemplary disassembled inoculation training kit 10 can include and outer container 12 and an inner container 14 adapted to fit within the outer container 12. The inoculation training kit 10 also includes a simulated body part 16, which is adapted to couple to a stand 11. In this particular embodiment, the simulated body part 16 corresponds to an arm, and the stand 18 corresponds to a shoulder. However, in other embodiments, a simulated body part and stand can represent other body parts. At least one bifurcated inoculation needle 32 is provided to allow a user to perform practice injections with the inoculation needle 32 applied to the simulated body part 16. The simulated body part 16 is further described in conjunction with FIGS. 3-3C, 7, and 8 below.

The inoculation training kit 10 can also include a reconstitution kit having a first vial 24a filled with powdered vaccine, a second vial 24b filled with diluent liquid, a syringe 31 with a needle 31 of approximately twenty-one gauge, and a vented needle 31. In practice, the reconstitution kit allows a user to create a simulated vial of smallpox vaccine, in the same way that would be done for a real vial of vaccine. The user uses the syringe 31 to draw diluent from the second vial 24b with the needle 31 and injects the diluent with the vented needle 31 into the first vial 24a containing the powdered vaccine. The vented needle 31 allows air to escape from the first vial 24a as the diluent is injected.

The inoculation training kit 10 can also include one or more of rubber gloves 35, hand sanitizer 22, gauze pads 25, a biohazard disposal bag 28, a surgical marker 30, adhesive dressings 34, a compact disc (CD) 36, and a CD tutorial pamphlet 37. The CD 36 can have audio, visual, or both audio and visual information thereon, providing instructions in proper techniques for administering the smallpox vaccination, proper appearance of the inoculation site in the days following the inoculation, and proper techniques for keeping others from becoming infected with the vaccine. The inoculation training kit 10 can also include at least one end cap 26a adapted to retain the above items in the inner container 14, during transport of the inoculation training kit. As described below in conjunction with FIG. 4, one or more of the end caps (only 26a shown) can have features to assist with the inoculation.

Figure 2:
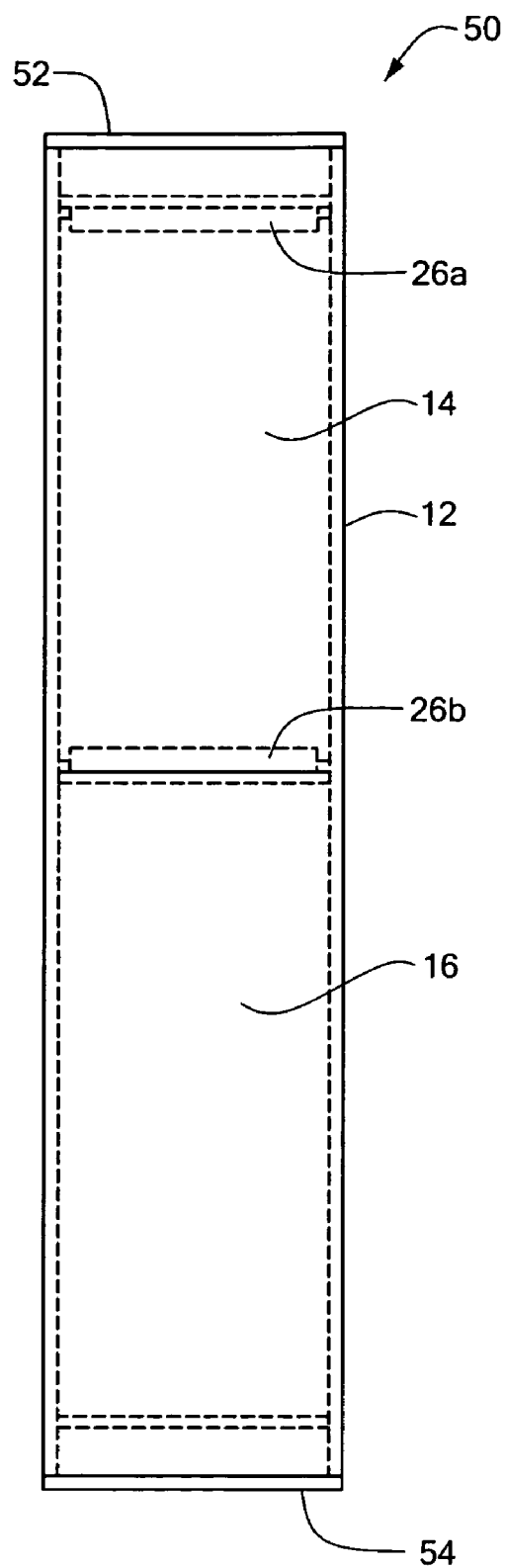
FIG. 2 is a diagram showing the inoculation training kit of FIG. 1 when assembled.

Referring now to FIG. 2, in which like elements of FIG. 1 are shown having like reference designations, an assembled inoculation training kit 50 corresponds to the disassembled inoculation training kit 10 of FIG. 1. The inner container 14 and the simulated body part 16 are adapted to fit within the outer container 12. End caps 26a, 26b retain one or more of the first vial 24a (FIG. 1) filled with powdered vaccine, the second vial 24b (FIG. 1) filled with diluent liquid, the syringe 31 (FIG. 1) with the needle 31 and the vented needle 31, the rubber gloves 35 (FIG. 1), the hand sanitizer 22 (FIG. 1), the gauze pads 25 (FIG. 1), the biohazard disposal bag 28 (FIG. 1), the surgical marker 30 (FIG. 1), the adhesive dressings 34 (FIG. 1), the compact disc (CD) 36 (FIG. 1), and the CD tutorial pamphlet 37 (FIG. 1) within the inner container 14 during transport. End caps 52, 54 retain the inner container 14 and the simulated body part 16 within the outer container during transport. The stand 18 shown in FIG. 1 is separately packaged for transport as shown in conjunction with FIG. 5 below.

Figure 3:
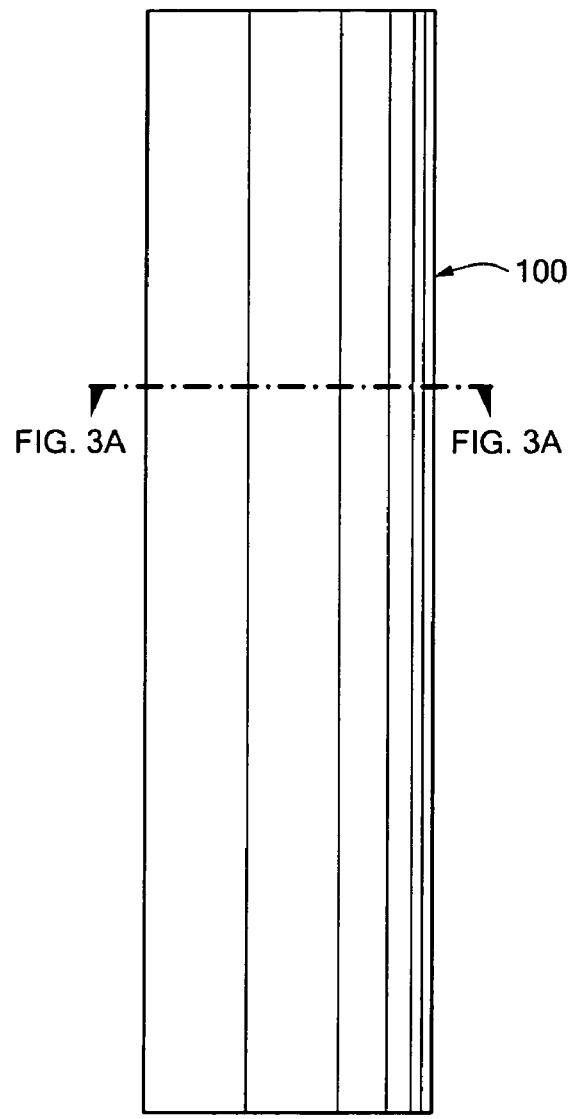
FIGS. 3-3C are diagrams that together show a simulated body part, which can be a part of the inoculation training kit of FIGS. 1 and 2.
Figure 3A:
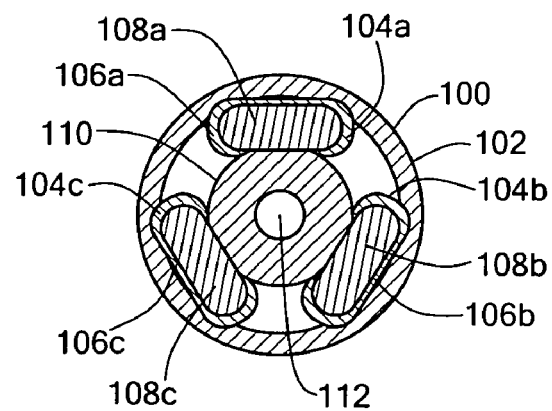
Figure 3B:
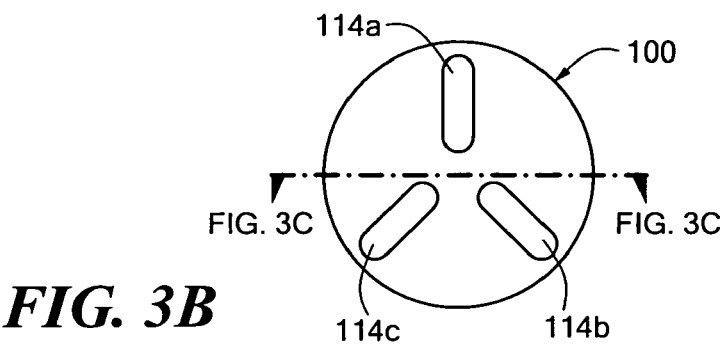
Figure 3C:
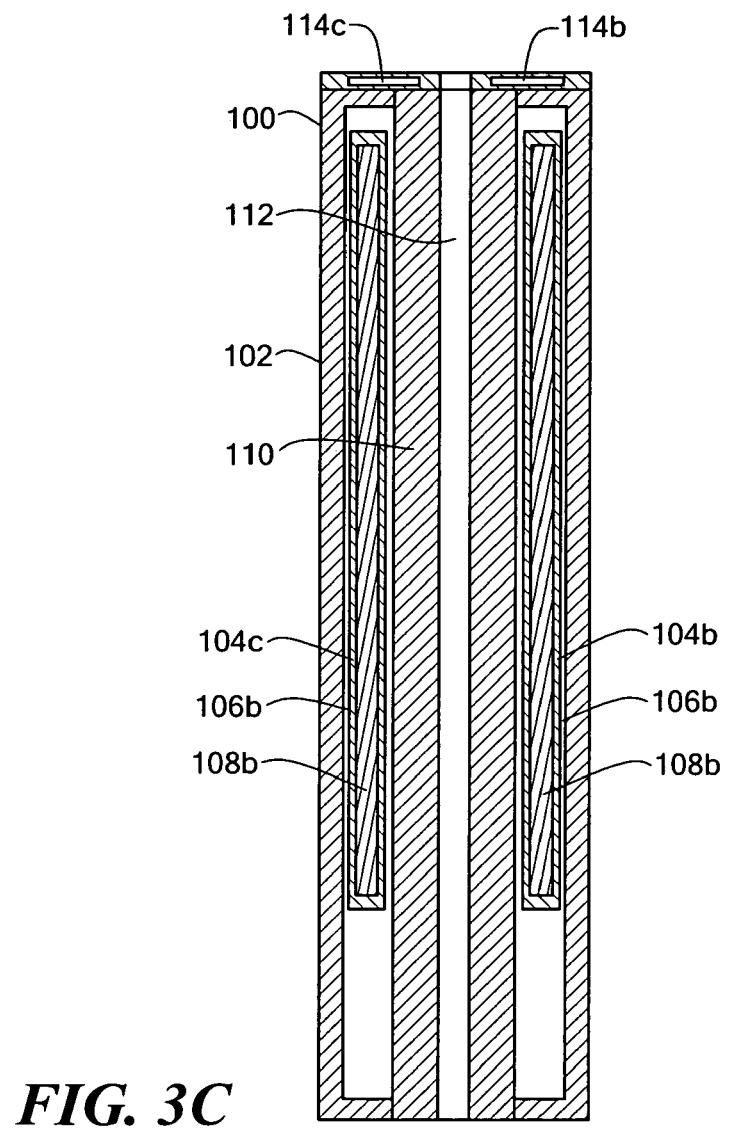

Referring now to FIGS. 3-3C, a simulated body part 100 corresponds to the simulated body part 16 of FIGS. 1 and 2. The simulated body part 100 includes blood containers 104a-104c containing simulated blood (not shown). The blood containers 104a-104c can be disposed between a simulated skin covering 102 and an inner core 110. The blood containers 104a-104c each include a respective blood bag 106a-106c with a respective sponge 108a-108c disposed therein containing the simulated blood. In response to a simulated inoculation applied to the simulated skin 102 (i.e., a stab with the bifurcated needle of FIG. 1), a small amount of the simulated blood is released from one of the sponges 108a-108c through the respective blood bag 104a-104c and through the simulated skin 102. However, in another embodiment, the small amount of simulated blood may be released only after a number of stabs with the bifurcated needle.

In one embodiment, the simulated skin 102 has a thickness of ranging from about twenty to forty mils and a durometer in the range of about sixty to eighty Shore A. The blood bags 106a-106c have a wall thickness in the range of about one to three mils and a durometer in the range of about eighty to ninety-five Shore A. The simulated blood within the sponges 108a-108c has a viscosity in the range of about one hundred to two hundred fifty cps. The sponges 108a-108c each have a durometer in the range of about zero to ten Shore A, and a thickness in the range of about one hundred twenty to two hundred mils. The sponges are each capable of holding about twenty-five to forty cubic centimeters of the simulated blood. The inner core has a durometer in the range of about thirty to forty-five Shore A.

In one particular embodiment, the simulated skin covering 102, the blood bags 106a-106c, the sponges 108a-108c, and the inner core 110 are made from a urethane material, for example polyurethane, providing life-like characteristics.

The simulated body part 100 can also have a bore 112 to accept a shaft portion of a stand, for example, of the stand 18 of FIG. 1, for positioning the simulated body part 100 on the stand 18. The simulated body part 100 can also have one or more ferrous portions 114a-114c having attraction to a magnet (not shown) associated with the stand 18, for retaining the simulated body part 100 to the stand 18.

While magnets and the ferrous portions 114a-114c are described above, one of ordinary skill in the art will understand that the simulated body part 100 can be retained to the stand 18 (FIG. 1) in a variety of ways, including but not limited to, latches, Velcro®, and pins.

In application, a user performs practice inoculations with one of the bifurcated needles 32 of FIG. 1. A practice inoculation involves reconstituting a simulated vial of vaccine into the vial of powered vaccine 24a (FIG. 1) as described above in conjunction with FIG. 1, applying fluid from the simulated vial of vaccine 24a (FIG. 1) to the bifurcated needle 32 (FIG. 1) and applying one or more practice jabs with the bifurcated needle 32 to the simulated body part 100, and in particular to the simulated skin covering 102 in the vicinity of one of the blood containers 104a-104c. As is known, a smallpox inoculation includes about fifteen stabs with the bifurcated needle if a person to whom the inoculation is administered has never had a smallpox inoculation. To a person previously vaccinated, about three stabs are applied.

The simulated body part 100 provides a substantially realistic sensory feedback to the user. For example, the simulated body part 100 can provide a substantially realistic haptic feedback to the user, wherein the simulated body part 100 has a substantially realistic hardness and a substantially realistic elastic deformation in response to the practice inoculation. For another example, the simulated body part 100 can provide a substantially realistic visual feedback to the user. The practice inoculations tend to create one or more punctures of the simulated skin covering 102 and in one of the blood containers 104a-104b containing the simulated blood. The punctures can release a small amount of the simulated blood at the location where the practice inoculation occurred. For example, the simulated body part 100 can release a small amount of the simulated blood when about three practice inoculations are applied and a greater amount of the simulated blood when about fifteen practice inoculations are applied. The viscosity of the simulated blood, the thickness and hardness of the simulated skin covering 102, the thickness and hardness of the blood bags 104a-104c, the thickness and hardness of the sponges 108a-108c, and the hardness of the inner core 110 are selected to provide the realistic sensory feedback.

While a particular embodiment of the simulated body part 100 having particular ranges of characteristics is described above to provide the realistic sensory feedback, it should be recognized that in other embodiments, the simulated body part 100 can have other ranges of characteristics, which in some combinations provide a reduced but still effective realistic sensory feedback. For example, in another embodiment, the simulated skin 102 has a thickness of ranging from about ten to one hundred mils and a durometer in the range of about twenty to eighty Shore A. The blood bags 106a-106c have a wall thickness in the range of about one to twenty mils and a durometer in the range of about forty to one hundred twenty Shore A. The simulated blood within the sponges 108a-108c has a viscosity in the range of about fifty to five hundred cps. The sponges 108a-108c each have a durometer in the range of about zero to thirty Shore A, and a thickness in the range of about sixty to four hundred mils. The sponges are each capable of holding about ten to eighty cubic centimeters of the simulated blood. The inner core has a durometer in the range of about fifteen to ninety Shore A.

While three blood containers 104a-104c are shown, each disposed at a relative angle of about one hundred twenty degrees from others of the blood containers 104a-104c, in other embodiments, more than three or fewer than three blood containers can be used and at different relative angles. For example, in one embodiment, one blood container surrounding the inner core 110 is provided, having one blood bag and one sponge disposed therein containing the simulated blood. Also, in an alternate embodiment, no inner core 110 is included, and the one or more blood containers 104a-104c are merely disposed within the simulated skin covering 102.

Figure 4:
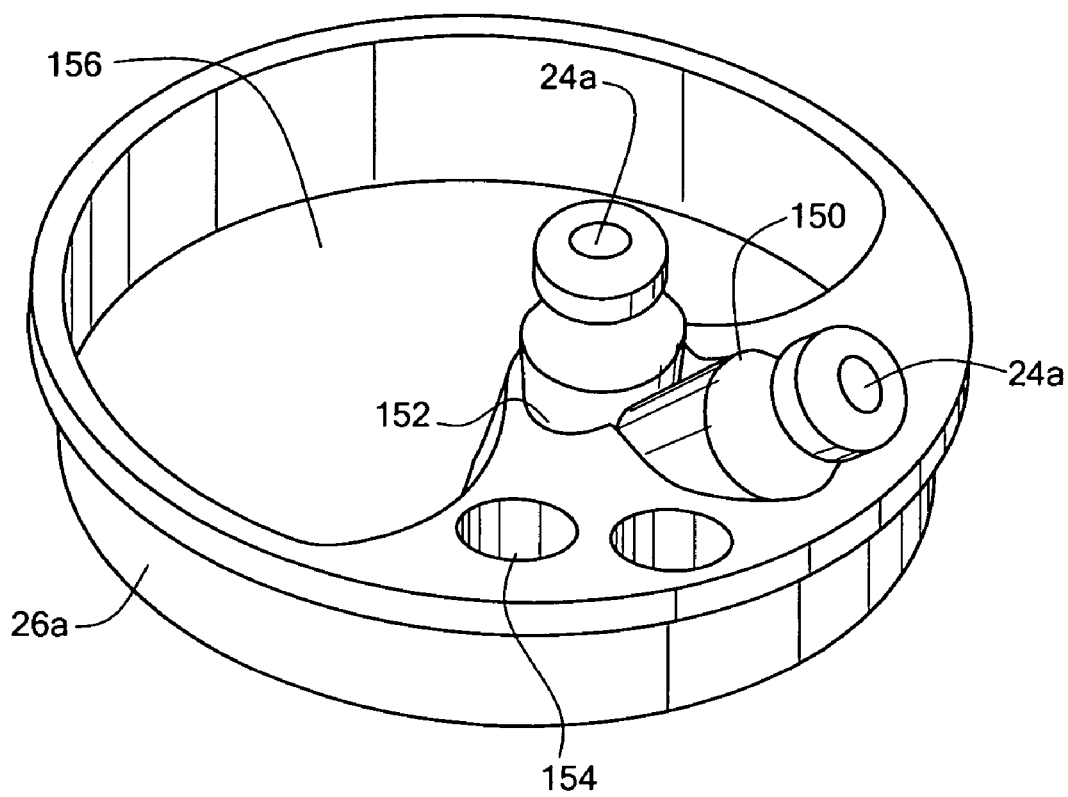
FIG. 4 is a diagram showing a cap, which can be a part of the inoculation training kit of FIGS. 1 and 2.

Referring now to FIG. 4, in which like elements of FIGS. 1 and 2 are shown having like reference designations, the end cap 26a can have at least one compartment 152 that can hold one or more of the simulated vials of vaccine 24a (FIG. 1) in a generally upright position, not subject to being spilled, when placed in the compartment 152. The cap 26a can have another compartment 150 that can hold one or more of the simulated vials of vaccine 24a (FIG. 1) in a position between approximately thirty and sixty degrees from upright, not subject to being spilled, when placed in the compartment 150. The cap can have yet another compartment 154 adapted to hold a top cap (not shown) of the simulated vial of vaccine 24a. Another compartment 156 can be used to hold other items, for example, the bifurcated needles 32 (FIG. 1).

While a cap having compartments 150-156 is shown, in another embodiment, the same compartments having the same functions can be provided in an alternate piece that does not form the cap 26a for the inner container 14. In this embodiment, the alternate piece can be retained within the inner container 14 during transport. Also, while the cap 26a having the compartments 150-156 has been described to be part of the inoculation kit 10 (FIG. 1), the alternate piece having the same features and functions as the cap 26a can be provided apart from the inoculation training kit, to hold vials of vaccine during real inoculations.

While the cap 26a is shown to have the compartments 150-156 it should be apparent that others of the caps 26b, 52, 54 (FIG. 2) can also have compartments, which may be the same or different than the compartments 150-156 in the cap 26a.

Figure 5:
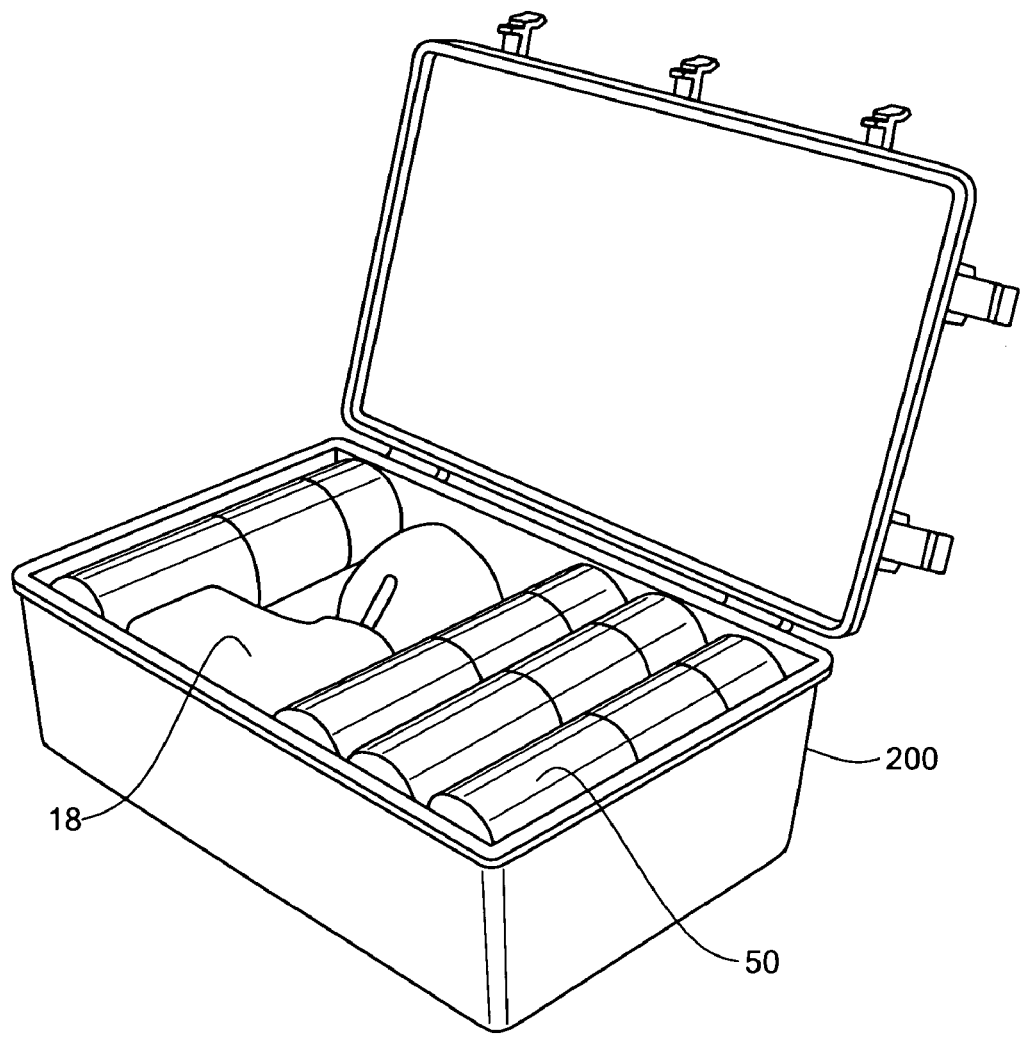
FIG. 5 is a diagram showing a plurality of inoculation training kits within a shipping container along with a stand used with the inoculation training kits.

Referring now to FIG. 5, an exemplary transportation box 200 can hold one or more of the assembled inoculation training kits, for example one or more of the assembled inoculation training kits 50 shown in FIG. 2. The transportation box 200 can also hold the frame 18 of FIG. 1.

Figure 6:
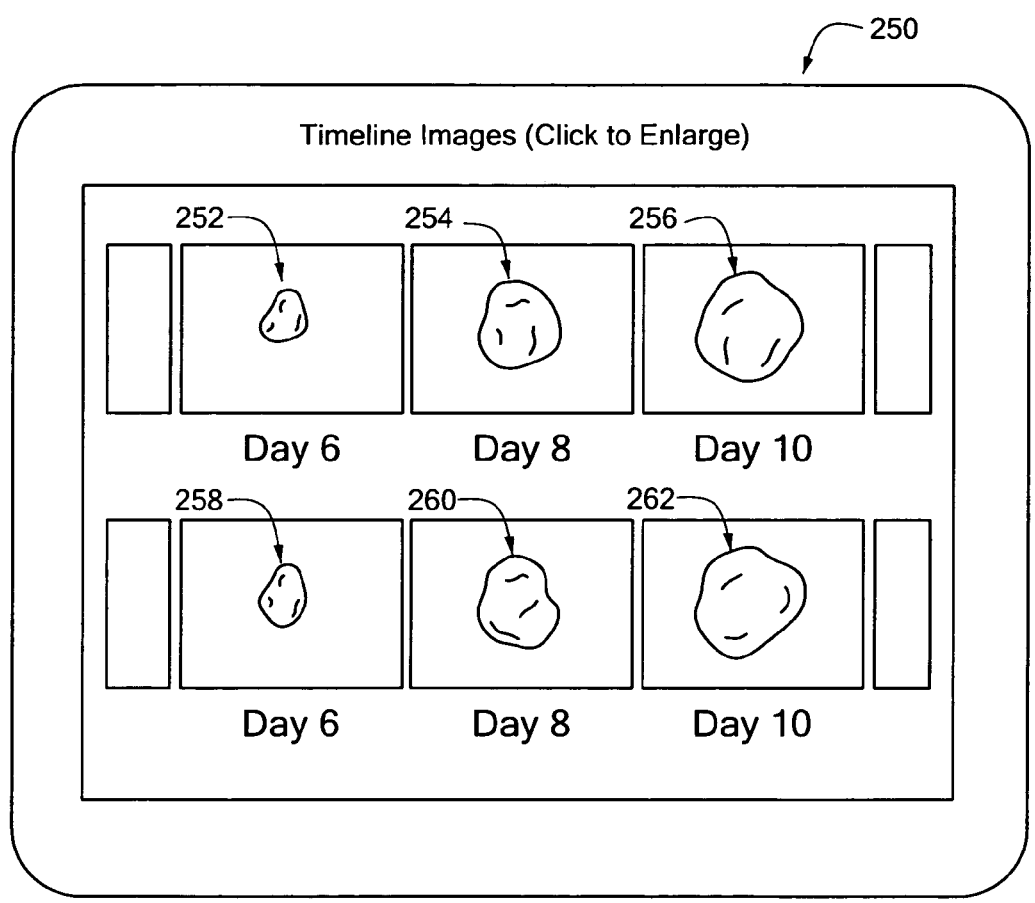
FIG. 6 is a diagram showing training materials, which can be a part of the inoculation training kit of FIGS. 1 and 2.

Referring now to FIG. 6, the training materials 36, 37 (FIG. 1), and in particular, the CD 36 of FIG. 1, can provide a visual description 250 of the appearance of the site of a real smallpox vaccination as a scar forms and heals on the arm of a real patient. The visual description 250 can include a plurality of descriptions associated with different patients, for example day-six descriptions 252, 258 from two patients, day-eight descriptions 254, 260 from two patients, and day-ten descriptions 256, 262 from two patients.

As is known, a successful smallpox inoculation is indicated by particular scarification that occurs in the days after an intradermal inoculation with smallpox vaccine. Therefore, it is very important in the training process to teach the user what the scarification should look like in the days following the smallpox inoculation.

While a smallpox vaccination applied with a bifurcated needle is described in conjunction with the above figures, the inoculation training kit is not limited to smallpox vaccinations or to a bifurcated needle. Many types of vaccinations are applied by injection with a hypodermic needle into a muscle of a patient. Therefore, in an alternate arrangement, the inoculation training kit can have one or more hypodermic needles and associated syringes in place of or in addition to the one or more bifurcated needles. A CD similar to the CD 36 (FIG. 1) can be provided to teach a user about other types of inoculations. The simulated body part 100 (FIG. 3-3C) can be adapted to provide the realistic sensory feedback, including release of a predetermined amount of the simulated blood when practice injections are applied with the hypodermic needle.

Figure 7:
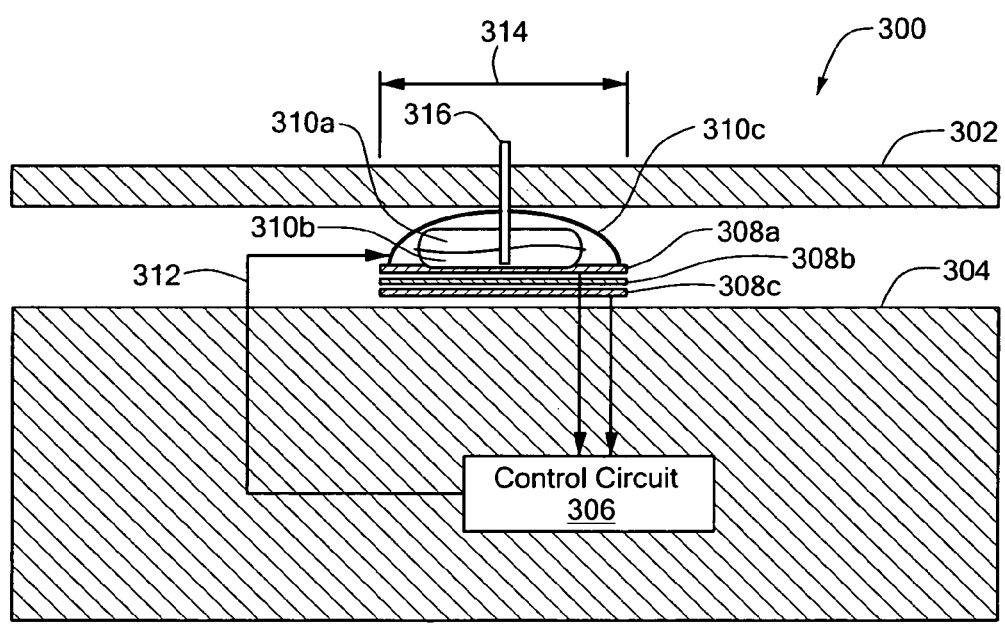
FIG. 7 is a diagram showing an alternate arrangement of portions of a simulated body part, which can be a part of the inoculation training kit of FIGS. 1 and 2.

Referring now to FIG. 7, an alternate arrangement 300 of portions of a simulated body part, for example the simulated body part 100 of FIGS. 3-3C, includes an alternate arrangement for providing the substantially realistic visual feedback to the user (i.e., the release of simulated blood). The alternate arrangement 300 includes a simulated skin covering 302, which can be the same as or similar to the simulated skin covering 102 of FIGS. 3-3C. A region 314 includes an orifice 316 through the simulated skin covering 302. A piezoelectric switch 308a-308c (also denoted 308 herein) is provided in the region 314. The piezoelectric switch 306 can include a piezoelectric film layer 306a, an insulating layer 306b, and a conductive reference layer 306c.

A blood reservoir 310a holding a volume of simulated blood 310b is fluidly coupled to the orifice 316. A control circuit 306 is adapted to activate one or more features 310c associated with the blood reservoir 310a in accordance with the signals received from the piezoelectric switch 308, causing a small amount of the simulated blood 310b to be released from the orifice 316, giving a user a substantially realistic visual feedback. In one particular embodiment, the one or more features 310c are Nitinol bands adapted to generate a hydraulic force in the blood reservoir 310a in response to a signal 312 from the control circuit 306. Nitinol (Nickel Titanium Naval Ordnance Laboratory) is a nickel-titanium alloy known to have a shape memory and to deform or return to its original shape upon application of a temperature. The temperature can be induced by application of a voltage or current. The blood reservoir 310a having the one or more Nitinol bands 310c is described more fully below in conjunction with FIG. 8.

In operation, a user applies one or more practice inoculations to the region 314. The region 308 can be clearly marked on the simulated skin covering 302. The piezoelectric switch 308 provides a signal to the control circuit 306 upon each practice inoculation, i.e., upon each practice stab with a bifurcated needle 32 (FIG. 1) upon the region 314. The practice inoculations can be counted by the control circuit 306. After a predetermined number of practice inoculations have been applied, the control circuit 306 generates a signal 312, causing the one or more Nitinol bands 310c to deform, resulting in a hydraulic force upon the blood reservoir 310a and a release of a small amount of the simulated blood 310b from the orifice 316.

The predetermined number of inoculations (i.e., practice stabs with the inoculation needle) that result in activation of the Nitinol bands 310c can be any number. As described above, a person who has never received a smallpox inoculation receives about fifteen stabs with the bifurcated needle in a real smallpox vaccination, and a person who has previously received a smallpox vaccination is subjected to about three stabs with the needle. Therefore, in one particular embodiment, the control circuit 306 can be selectively set to count either about fifteen or about three practice inoculations and to provide the signal 312 to the one or more Nitinol bands 310c accordingly.

While a piezoelectric switch 308 is shown and described, it will be understood that a variety of types of switch can be used, including but not limited to, a mechanical switch.

Figure 8:
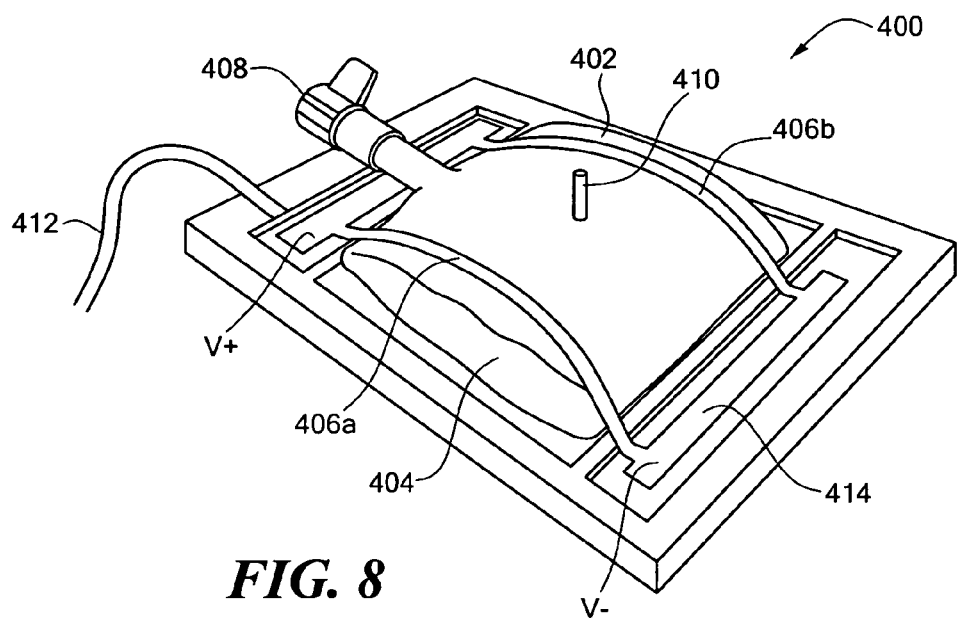
FIG. 8 is a portion of the alternate arrangement of FIG. 7.

Referring now to FIG. 8, apparatus 400 can be used to generate the hydraulic force described above. The apparatus 400 includes a blood reservoir 402 having an outlet 410 and containing simulated blood 404. Nitinol bands 406a, 406b surround at least a portion of the blood reservoir 402. The apparatus 400 can include a piezoelectric switch 414, which can correspond, for example, to the piezoelectric switch 408 of FIG. 7. The blood reservoir 402 can correspond, for example, to the blood reservoir 310a having the simulated blood 310b of FIG. 7 and the Nitinol bands 406a, 406b can correspond to the one or more Nitinol bands 310c of FIG. 7.

In operation, the Nitinol bands 406a, 406b are adapted to deform when a voltage, V+, V−, is applied to them. The amount of deformation is proportional to the voltage. Therefore, it will be understood that the Nitinol bands 406a, 406b can provide a hydraulic force to force an amount of the simulated blood 404 out of the outlet 410 in response to the voltage.

A control circuit, for example, the control circuit 306 shown in FIG. 7, can be used to provide the voltages V+ and V− to one or more of the Nitinol bands 406a, 406b. The voltages V+ and V− can correspond, for example, to the signal 312 of FIG. 7. The control circuit 306, as described above, can count a number of practice jabs with a needle, for example upon the region 314 (FIG. 7) having the piezoelectric switch 414. The control circuit 306 can provide the voltage to the Nitinol bands 406a, 406b accordingly.

While Nitinol bands 306a, 306b adapted to provide the hydraulic force are shown, other configurations of Nitinol material can also be used. For example, a spring made from the Nitinol material can be used.

Figure 9:
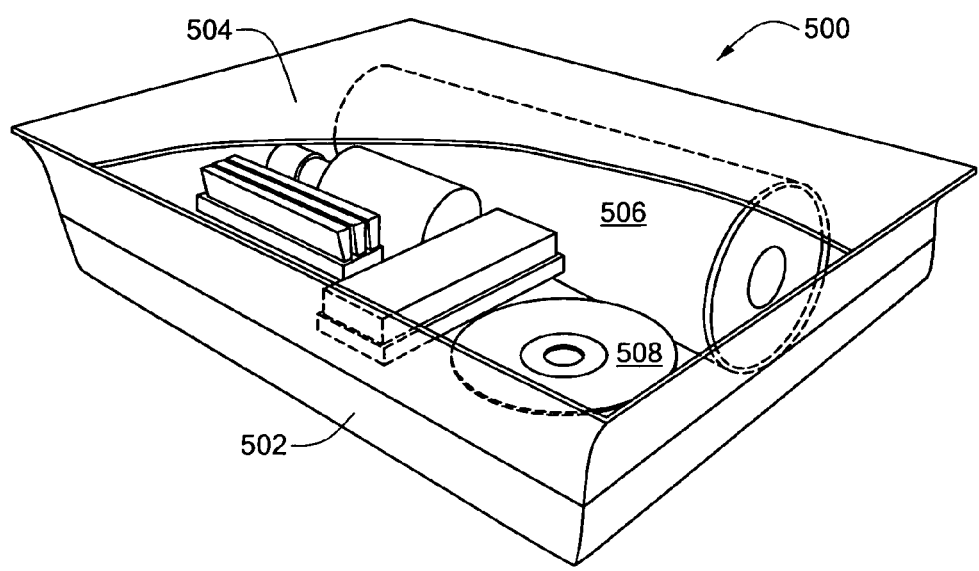
FIG. 9 is a diagram showing an alternate arrangement of an assembled inoculation training kit.

Referring now to FIG. 9, in an alternate arrangement, an inoculation training kit 500 can be packaged in a tray 502 having a removable cover 504. The inoculation training kit can contain a simulated body part 506, and a CD 508 having training instructions thereon. The simulated body part 506 can be the same as or similar to the simulated body part 16 of FIGS. 1 and 2, and the simulated body part 100 of FIG. 3. The CD 508 can be the same as or similar to the CD 36 shown in FIG. 1. The inoculation training kit 500 can include some or all of the other items described in conjunction with the inoculation training kit 10 of FIG. 1, including but not limited to one or more of the first vial 24a (FIG. 1) filled with powdered vaccine, the second vial 24b (FIG. 1) filled with diluent liquid, the syringe 31 (FIG. 1) with the needle 31 and the vented needle 31, the rubber gloves 35 (FIG. 1), the hand sanitizer 22 (FIG. 1), the gauze pads 25 (FIG. 1), the biohazard disposal bag 28 (FIG. 1), the surgical marker 30 (FIG. 1), the adhesive dressings 34 (FIG. 1), the compact disc (CD) 36 (FIG. 1), and the CD tutorial pamphlet 37 (FIG. 1).

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. An inoculation training kit, comprising:
a holding container, having disposed therein:
an inoculation needle; and
a simulated body part having a substantially realistic sensory feedback associated with practice inoculations applied with the inoculation needle to the simulated body parts,
wherein the holding container includes an outer cylindrical container and an inner cylindrical container, wherein the inner cylindrical container and the simulated body part are adapted to fit within the outer cylindrical container, wherein the inner cylindrical container contains the inoculation needle.

2. The inoculation training kit of claim 1, wherein the substantially realistic sensory feedback includes at least one of substantially realistic haptic feedback and substantially realistic visual feedback.

3. The inoculation training kit of claim 2, wherein the substantially realistic visual feedback includes simulated bleeding.

4. The inoculation training kit of claim 2, wherein the substantially realistic visual feedback includes elastic deformation of the simulated body part.

5. The inoculation training kit of claim 1, wherein the simulated body part includes a blood container containing simulated blood and the simulated body part is adapted to release a predetermined amount of the simulated blood in response to the practice inoculations applied with the inoculation needle to the simulated body part.

6. The inoculation training kit of claim 5, wherein the simulated blood has a viscosity of about fifty to five hundred cps.

7. The inoculation training kit of claim 5, wherein the blood container comprises a bag and a sponge disposed within the bag, wherein the sponge contains the simulated blood.

8. The inoculation training kit of claim 7, wherein a wall of the bag has a thickness of about one to twenty mils and a durometer of about forty to one hundred twenty Shore A.

9. The inoculation training kit of claim 1, wherein the simulated body part includes a simulated skin covering.

10. The inoculation training kit of claim 9, wherein the simulated skin covering has a thickness of about ten to one hundred mils and a durometer of about twenty to eighty Shore A.

11. The inoculation training kit of claim 1, wherein the simulated body part includes an inner core.

12. The inoculation training kit of claim 11, wherein the inner core has a durometer of about fifteen to ninety Shore A.

13. The inoculation training kit of claim 1, wherein the simulated body part includes:
a simulated skin covering having a thickness of about ten to one hundred mils and a durometer of about twenty to eighty Shore A;
an inner core having a durometer of about fifteen to ninety Shore A; and
a blood container containing simulated blood disposed between the simulated skin and the inner core, wherein the simulated body part is adapted to release a predetermined amount of the simulated blood in response to the practice inoculations applied with the inoculation needle to the simulated body part.

14. The inoculation training kit of claim 13, wherein the blood container includes a bag with a wall thickness of about one to twenty mils and with a durometer of about forty to one hundred twenty Shore A and having a sponge disposed within the bag containing the simulated blood having a viscosity of about fifty to five hundred cps.

15. The inoculation training kit of claim 13, wherein at least one of the simulated skin, the blood container, and the inner core is made from polyurethane.

16. The inoculation training kit of claim 1, wherein the simulated body part comprises a simulated portion of a human arm.

17. The inoculation training kit of claim 1, wherein the inoculation needle comprises a bifurcated needle.

18. The inoculation training kit of claim 1, wherein the inoculation needle comprises a hypodermic needle and a syringe adapted to couple to the hypodermic needle.

19. The inoculation training kit of claim 1, wherein the holding container has further disposed therein at least one of a disinfecting agent, a surgical glove, a vial of simulated vaccine, and instructions for administering the simulated vaccine with the inoculation needle.

20. The inoculation training kit of claim 1, wherein at least one of the outer cylindrical container and the inner cylindrical container includes at least one removable cap having at least one compartment to hold a vial of simulated vaccine in an upright position when the removable cap is removed from the inner container and placed on a generally horizontal surface and the vial of simulated vaccine is placed upright in the compartment.

21. The inoculation training kit of claim 1, further including a stand having a retention mechanism adapted to retain the simulated body part to the stand.

22. The inoculation training kit of claim 21, wherein the stand has a shape corresponding to a shoulder, and the simulated body part has a shape corresponding to a portion of an arm.

23. The inoculation training kit of claim 22, wherein the stand, when coupled to the simulated body part and disposed upon a top surface of a table, is at height corresponding to a height of a person when sitting in a chair.

24. The inoculation training kit of claim 22, wherein retention mechanism includes a magnet.

25. The inoculation training kit of claim 1, wherein the holding container comprises a holding tray having compartments adapted to hold the inoculation needle and the simulated body part.

26. The inoculation training kit of claim 25, further including a removable cover over the holding tray adapted to retain the inoculation needle and the simulated body part in the holding tray during transport.

27. The inoculation training kit of claim 1, wherein the holding container has further disposed therein instructions for administering a vaccine with the inoculation needle comprising a compact disc (CD) having the instructions disposed thereon.

28. The inoculation training kit of claim 27, wherein the holding container has a removable cap and the CD is removably coupled to a surface of the removable cap.

29. A simulated body part, comprising:
a simulated skin covering; and
a blood container containing simulated blood disposed within the simulated skin covering, wherein the simulated body part provides a substantially realistic sensory feedback associated with practice inoculations applied to the simulated body part,
wherein the blood container comprises a bag and a sponge disposed within the bag, the sponge containing the simulated blood.

30. The simulated body part of claim 29, wherein the substantially realistic sensory feedback includes at least one of substantially realistic haptic feedback and substantially realistic visual feedback.

31. The simulated body part of claim 30, wherein the substantially realistic visual feedback includes simulated bleeding.

32. The simulated body part of claim 30, wherein the substantially realistic visual feedback includes elastic deformation of the simulated body part.

33. The simulated body part of claim 29, wherein the simulated skin covering has a thickness of about ten to one hundred mils and a durometer of about twenty to eighty Shore A.

34. The simulated body part of claim 29, further including a inner core and the blood container is disposed between the simulated skin covering and the inner core, wherein the inner core has a durometer of about fifteen to ninety Shore A.

35. The simulated body part of claim 29, wherein the bag has a wall thickness of about one to twenty mils and a durometer of about forty to one hundred twenty Shore A, and the simulated blood has a viscosity of about fifty to five hundred cps, wherein the simulated body part is adapted to release a predetermined amount of the simulated blood in response to the practice inoculations applied to the simulated body part.

36. The simulated body part of claim 29 further including a inner core and the blood container is disposed between the simulated skin covering and the inner core, wherein the simulated skin covering has a thickness of about ten to one hundred mils and a durometer of about twenty to eighty Shore A, the inner core has a durometer of about fifteen to ninety Shore A, and the bag has a wall thickness of about one to twenty mils and a durometer of about forty to one hundred twenty Shore A, and the simulated blood has a viscosity of about fifty to five hundred cps, wherein the simulated body part is adapted to release a predetermined amount of the simulated blood upon a practice inoculation applied to the simulated body part.

37. A simulated body part, comprising:
a simulated skin covering; and a blood container containing simulated blood disposed within the simulated skin covering, wherein the simulated body part provides a substantially realistic sensory feedback associated with practice inoculations applied to the simulated body part, wherein the blood container comprises:

a blood reservoir containing simulated blood;

a blood orifice coupled to the simulated skin covering;

a blood pump coupled to the blood reservoir and to the blood orifice, including at least one Nitinol portion coupled to the processor and adapted to squeeze the blood reservoir to generate a hydraulic force; and a processor adapted to detect the practice inoculations applied to the simulated body part and further adapted to activate the blood pump to generate the hydraulic force to move a predetermined amount of the simulated blood from the blood reservoir to the blood orifice in response to a predetermined number of the practice inoculations applied to the simulated body part.

38. The simulated body part of claim 37, wherein the processor includes a counter adapted to count the predetermined number of practice inoculations, and wherein the processor is adapted to activate the blood pump in response to the counted predetermined number of the practice inoculations.

39. The simulated body part of claim 38, further including a mechanical switch coupled to the simulated skin and to the processor and adapted to sense the practice inoculations.

40. The simulated body part of claim 38, further including at least one of a piezoelectric film and a piezoelectric element coupled to the simulated skin and to the processor and adapted to sense the practice inoculations.

41. The simulated body part of claim 37, wherein the predetermined number of practice inoculations is selectable.

42. The simulated body part of claim 29, wherein the substantially realistic sensory feedback is associated with practice inoculations applied with a bifurcated needle.

43. The simulated body part of claim 29, wherein the substantially realistic sensory feedback is associated with practice inoculations applied with a hypodermic needle.

44. A simulated body part, comprising:

a simulated skin covering; and an inner core; and a blood container containing simulated blood, the blood container being disposed between the simulated skin covering and the inner core, wherein the simulated body part provides a substantially realistic sensory feedback associated with practice inoculations applied to the simulated body part.

45. The simulated body part of claim 44, wherein the substantially realistic sensory feedback is associated with practice inoculations applied with a bifurcated needle.

46. The simulated body part of claim 44, wherein the blood container comprises a bag and a sponge disposed within the bag, wherein the sponge contains the simulated blood.

47. The simulated body part of claim 46, wherein a wall of the bag has a thickness of about one to twenty mils and a durometer of about forty to one hundred twenty Shore A.

* * * * *